US010302999B2

(12) United States Patent
Matsumoto

(10) Patent No.: US 10,302,999 B2
(45) Date of Patent: May 28, 2019

(54) LIGHT SOURCE DEVICE AND DISPLAY DEVICE

(71) Applicant: Sakai Display Products Corporation, Osaka (JP)

(72) Inventor: Kouji Matsumoto, Osaka (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 0 days.

(21) Appl. No.: 15/692,064

(22) Filed: Aug. 31, 2017

(65) Prior Publication Data

US 2017/0363911 A1 Dec. 21, 2017

Related U.S. Application Data

(63) Continuation-in-part of application No. PCT/JP2015/056386, filed on Mar. 4, 2015.

(51) Int. Cl.
*G02F 1/1333* (2006.01)
*G02F 1/1335* (2006.01)
*F21V 8/00* (2006.01)

(52) U.S. Cl.
CPC ..... *G02F 1/133615* (2013.01); *G02B 6/0055* (2013.01); *G02B 6/0068* (2013.01);
(Continued)

(58) Field of Classification Search
CPC ......... G02F 1/133615; G02F 1/133308; G02B 6/0073; G02B 6/0068; G02B 6/0088; G02B 6/0055
See application file for complete search history.

(56) References Cited

U.S. PATENT DOCUMENTS

2007/0182880 A1\* 8/2007 Yamada ............... G02B 6/0055
349/61
2007/0279944 A1\* 12/2007 Sakai ................... G02B 6/0031
362/633
(Continued)

FOREIGN PATENT DOCUMENTS

JP 2006302762 A 11/2006
JP 2008016433 A 1/2008
(Continued)

OTHER PUBLICATIONS

English Translation of the International Search Report, PCT International Application No. PCT/JP2015/056386, Japan Patent Office, Tokyo, Japan. Apr. 7, 2015.

*Primary Examiner* — Donald L Raleigh
(74) *Attorney, Agent, or Firm* — Marsh Fischmann & Breyfogle LLP

(57) ABSTRACT

There are provided a light source device and a display device, in which the contact of the light guiding plate with the light source can be prevented. The light source device includes a light guiding plate and a light source member disposed opposite to a light-entering surface of the light guiding plate, wherein light radiated by the light source enters from the light-entering surface and emits from a light-emitting surface of the light guiding plate. The light source device further includes a frame structure and a heat radiator supporting the light source member, wherein the frame structure includes a contact-preventing part disposed between the substrate of the light source member and the light-entering surface to prevent the contact of the light-entering surface with the light source, and portions of the heat radiator and the contact-preventing part each facing the light source have light reflectivity.

9 Claims, 8 Drawing Sheets

(52) U.S. Cl.
CPC ......... *G02B 6/0073* (2013.01); *G02B 6/0088* (2013.01); *G02B 6/0091* (2013.01); *G02F 1/133308* (2013.01); *G02B 6/0031* (2013.01); *G02B 6/0085* (2013.01)

(56) References Cited

U.S. PATENT DOCUMENTS

| | | | | |
|---|---|---|---|---|
| 2011/0128463 A1* | 6/2011 | Ji | ................ | G02F 1/133308 |
| | | | | 349/58 |
| 2011/0141400 A1* | 6/2011 | Heo | ................ | G02F 1/133615 |
| | | | | 349/65 |
| 2011/0149190 A1* | 6/2011 | Kim | ................ | G02F 1/133615 |
| | | | | 349/58 |
| 2011/0176331 A1* | 7/2011 | Yang | ................ | G02F 1/133615 |
| | | | | 362/612 |
| 2012/0249886 A1* | 10/2012 | Kuromizu | ............ | G02B 6/0088 |
| | | | | 348/725 |
| 2012/0281151 A1* | 11/2012 | Abe | ................ | G02B 6/0091 |
| | | | | 348/739 |
| 2012/0293715 A1* | 11/2012 | Kasai | ................ | G02B 6/0091 |
| | | | | 348/725 |
| 2014/0320747 A1 | 10/2014 | Kamada | | |
| 2014/0375891 A1* | 12/2014 | Hosoki | ............ | G02F 1/133308 |
| | | | | 348/725 |
| 2015/0205036 A1* | 7/2015 | Shimizu | ............ | H04N 5/66 |
| | | | | 348/790 |

FOREIGN PATENT DOCUMENTS

| | | |
|---|---|---|
| JP | 2008-300170 A | 12/2008 |
| JP | 2010079105 A | 4/2010 |
| WO | 2011/083643 A1 | 7/2011 |
| WO | 2013/018648 A1 | 2/2013 |
| WO | 2013051474 A1 | 4/2013 |
| WO | 2014/021303 A1 | 2/2014 |

* cited by examiner

LIGHT SOURCE DEVICE AND DISPLAY DEVICE

CROSS-REFERENCE TO RELATED APPLICATION

This is a continuation-in-part of PCT international application. No. PCT/JP2015/056386 filed on Mar. 4, 2015, incorporated herein by reference.

BACKGROUND OF THE INVENTION

The present disclosure relates to an edge-light type light source device and a display device.

A display device with a liquid crystal panel, commonly referred to as a thin type such as a liquid crystal television, includes: a substantially rectangular parallelepiped display panel having a surface to display an image in front of it; and a light source device disposed at the back of the display panel and arranged to radiate light toward the display panel.

Examples of the light source device which are employed generally, include a direct light type light source device including: a diffusing plate and a support substrate to support the diffusing plate which are disposed at the back of the display panel; and a light source such as a cold cathode fluorescent lamp (CCFL), a light emitting diode (LED) or the like which is disposed at the back of the diffusing plate, and an edge-light type light source device including: a light guiding plate and a support substrate to support the light guiding plate which are disposed at the back of the display panel; and a light emitting diode positioned opposite to one of the edges of the light guiding plate (reference can be made to, for example, JP 2008-300170 A).

The light source device of edge-light type may include a plurality of light emitting diodes arranged in parallel and opposite to one of the edges of the light guiding plate, and light radiated by the light emitting diodes passes through a light-entering surface and enters the light guiding plate and is diffused by the light guiding plate and emitted from a light-emitting surface of the light guiding plate. It would be advantageous to employ an edge-light type device for the light source device, so that a thickness between the front and back surface of the display device can be reduced, providing a thickness reduction of the display device, when compared with the display device of direct light type, in which a plurality of light sources is arranged in parallel and at the back of the diffusing plate.

Since the light source device of direct-light type includes a plurality of cold cathode fluorescent lamps or light emitting diodes arranged in parallel and opposite to one of the surfaces of the diffusing plate over the entire surface, the heat from the light source, generated when the light source emits light, is conducted to the entire part of the support substrate that is made of metal plate, allowing heat radiation from the entire support substrate.

On the other hand, an edge-light type light source device is often configured to have a reduced space between a light source and a light guiding plate since a broader space between them will reduce a light input efficiency, being unable to provide a required luminance. Therefore, there was a possibility that the light guiding plate could be expanded by the heat from a light source, due to a high linear expansion coefficient of the light guiding plate, and come into contact with the light source, causing breakage of the light source while the heat from the light source, generated when the light source emits light, was conducted to the light guiding plate.

SUMMARY OF THE INVENTION

The present invention has been made in view of such circumstances as mentioned above, and an object of the present invention is to provide a light source device and a display device wherein the contact of a light guiding plate with a light source can be avoided even when the light guiding plate is expanded by the heat from the light source.

A light source device according to one embodiment of the present application comprises: a light guiding plate having a is light-entering surface, a light-emitting surface, and a back surface opposite to the light-emitting surface; a light source member having a light source and a substrate on which the light source is mounted, the light source being disposed opposite to the light-entering surface of the light guiding plate; a frame structure having a shielding part, the shielding part covering a peripheral part of the light-emitting surface of the light guiding plate; and a heat radiator supporting the substrate of the light source member, wherein the frame structure is provided with a contact-preventing part to prevent the contact of the light-entering surface with the light source, the contact-preventing part being disposed between the light source member and the light-entering surface, and a portion of the heat radiator facing the light source and a portion of contact-preventing part facing the light source each has light reflectivity.

In another embodiment of the present application, the contact-preventing part is formed by a light reflective resin.

In another embodiment of the light source device according to the present application, the heat radiator comprises a protruded part protruding toward the light source and a reflection sheet to reflect light, the reflection sheet being adhered on a surface of the protruded part facing the light source.

In yet another embodiment of the present application, the substrate is a strip-like substrate and the light source comprises a plurality of LEDs, the plurality of LEDs being mounted on the strip-like substrate along a longitudinal direction of the substrate, the contact-preventing part comprises a wall enclosing the plurality of LEDs.

In yet another embodiment of the present application, the substrate is a strip-like substrate and the light source comprises a plurality of LEDs, the plurality of LEDs being mounted on the strip-like substrate along a longitudinal direction of the substrate, the contact-preventing part comprises a plurality of walls each enclosing each of the plurality of LEDs.

A display device according to one embodiment of the present application comprises: the foregoing light source device; and a display panel disposed opposite to the light-emitting surface of the light guiding plate of the light source device.

In the presently illustrated embodiments, even when the light guiding plate is expanded by the heat from the light source, the contact of the light guiding plate with the light source can be avoided, and further, the utilization percentage of the light radiated by the light source can be increased.

DETAILED DESCRIPTION

The invention will be further described below in terms of several embodiments and particularly in terms of drawings showing some embodiments.

Embodiment 1

Figure 1:
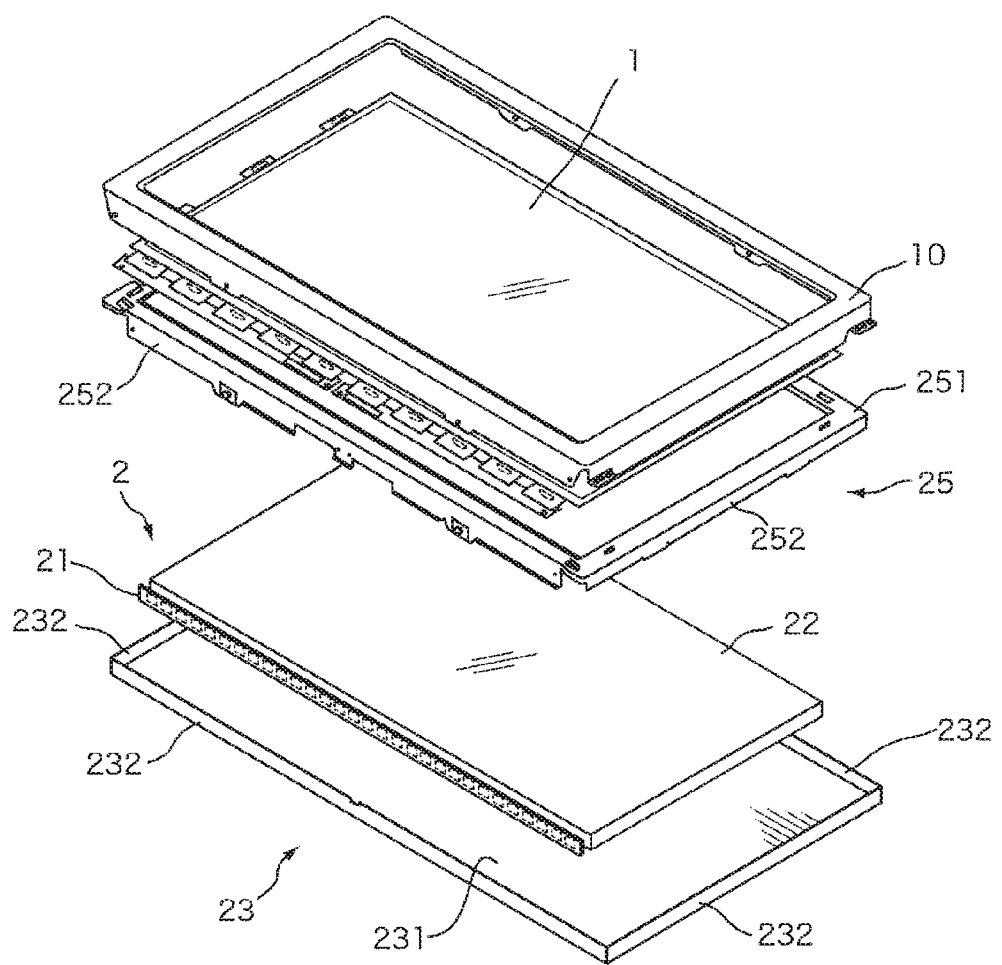
FIG. 1 shows a break-up perspective view of a display device according to Embodiment 1.
Figure 2:
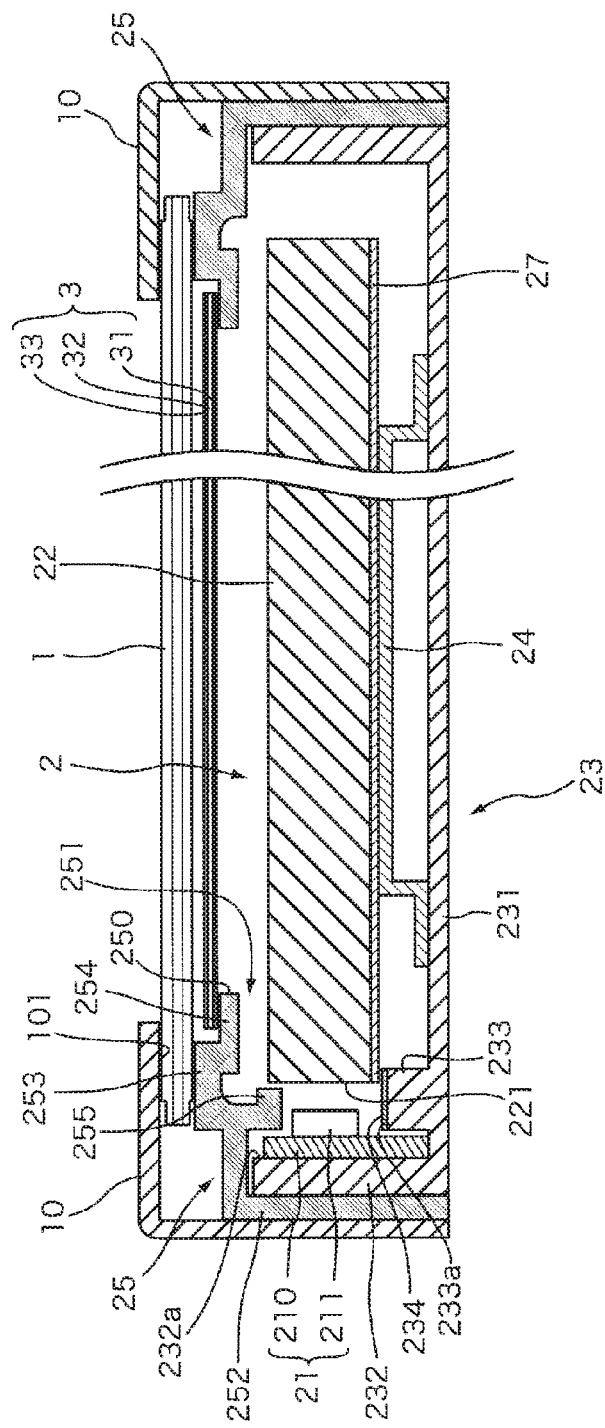
FIG. 2 shows a longitudinal sectional view of a display device according to Embodiment 1.

FIG. 1 shows a break-up perspective view of a display device according to Embodiment 1, and FIG. 2 shows a longitudinal sectional view of a display device according to Embodiment 1. The display device according to this embodiment is a liquid crystal display device including a rectangular plate-like liquid crystal panel 1 and an edge-light type light source device 2 disposed at the back of the liquid crystal panel 1.

The liquid crystal panel 1 may be a rectangular display panel provided with a plurality of liquid crystal elements arranged in, for example, a two-dimensional matrix.

An optical sheet group 3 of the illustrated device is disposed between the liquid crystal panel 1 and the light source device 2. The optical sheet group 3 can be stacking structures including, for example, but not limited to, a light diffusing sheet 31, a prism sheet 32 and a polarization sheet 33. The light diffusing sheet 31 can be, for example, a sheet made of a polyethylene terephthalate (PET) film or a polycarbonate (PC) film and configured to diffuse light to be input from a light guiding plate 22. The prism sheet 32 can be, for example, a sheet made of a polyester sheet on one surface of which a regular prism pattern is formed with an acrylic resin. The polarizing sheet 33 can be, for example, a sheet made of a polyethylene naphthalate film and configured to convert light to enter into the liquid crystal panel 1 into linearly polarized light.

The light source device 2 may include, for example, a light source member 21, a light guiding plate 22, a heat spreader 23, a back light chassis 24, a panel chassis 25 and be configured to guide the light radiated by the light source member 21 to the liquid crystal panel 1 (to the direction of the viewer) through the light guiding plate 22 and to irradiate the liquid crystal panel 1 with the light transmitted through the optical sheet group 3.

The light source member 21 may include a strip-like substrate 210 and a plurality of LED chips 211 mounted on the substrate 210 along a longitudinal direction of the substrate 210 at substantially equal intervals. The LED chip 211 is, for example, but not limited to, constituted by packaging a light emitting diode element, a phosphor covering the light emitting diode element and a housing which houses them. Each of the LED chips 211 may have a flat rectangular cuboid shape with a dimension of, for example, 5 mm in a longitudinal direction and 3 mm in a width direction of the substrate 210, and about 1 mm, of height from a surface of the substrate 210.

The light guiding plate 22 of the illustrated device is made of a synthetic resin such as an acrylic resin or a polycarbonate resin is having a high transparency, and formed in a rectangular plate shape. A light-entering surface 221, which is one of the edges of the light guiding plate 22, is disposed opposite to the LED chip 211 of the light source member 21, and a back surface of the light guiding plate 22 is provided with a reflection sheet 27 made of a synthetic resin having a high reflectivity. The light guiding plate 22 with a thickness of, for example, about 4 to 5 mm, which is slightly wider than the width of the LED chip 211, can be used.

The light guiding plate 22 may output the light, which is radiated by the light source member 21 and passes through the light-entering surface 221 and enters the light guiding plate 22, to the liquid crystal panel 1. On this account, the light guiding plate 22 can be provided with a scattering and reflection part to output the light entered from the light-entering surface 221 to the liquid crystal panel 1. Examples of the scattering and reflection part to be used may include, but not limited to, a light scattering structure formed by printing, molding or the like on the back surface of the light guiding plate 22, a light scattering structure formed inside the light guiding plate 22, an optical element to change a direction to which light is guided, or the like. The light scattered by the scattering and reflection part of the light guiding plate 22 and the light reflected on a surface of the reflection sheet 27 are emitted from a light-emitting surface of the light guiding plate 22.

In the presently illustrated embodiment, the configuration in which the light source member 21 is disposed opposite to the light-entering surface 221 of the light guiding plate 22 will be discussed, however, it should be understood that the configuration in which two light source members 21 are disposed such that each one of the two will be facing to one of the two opposite edges of the light guiding plate 22 can be applied.

The heat spreader 23 of the illustrated device is a heat radiator having a box shape with a shallow bottom. The heat spreader 23 can be made of a material such as aluminum or the like having excellent thermal conductivity, and include a bottom plate part 231 having a rectangular shape slightly larger than the light guiding plate 22 and four wall portions 232 rising from a peripheral part of the bottom plate part 231 toward the light guiding plate 22.

One or more screw holes (not shown) can be provided in an inner surface 232a of one of the four wall parts 232 (for example, the wall part 232 at the left end of FIG. 2). Further, the substrate 210 of the light source member 21 may include one or more insertion holes (not shown) at positions corresponding to the screw holes of the heat spreader 23. The light source member 21 can be supported by the heat spreader 23 by screwing the substrate 210 through one or more screw holes provided in the inner surface 232a of the wall part 232. This configuration allows the heat generated at the light source member 21 to be released to an outside through the heat spreader 23.

The bottom plate part 231 of the heat spreader 23 may include a protruded part 233, protruding toward the LED chip 211 between the light source member 21 and the light-entering surface 221 of the light guiding plate 22. In the illustrated embodiment, the protruded part 233 has a height that the protruded part 233 does not contact with the LED chips 211, and a reflection sheet 234 is adhered on a portion 233a of the protruded part 233, which is facing the LED chip 211. This can prevent a part of the light radiated by the light source member 21 from leaking to the back of the light guiding plate 22 and ensure that it is reflected on a surface of the reflection sheet 234 and enters the light guiding plate 22 through the light-entering surface 221.

The back light chassis 24 of the illustrated device is a supporting member which is disposed between the bottom plate part 231 of the heat spreader 23 and the light guiding plate 22 and supports the light guiding plate 22 by abutting against the reflection sheet 27 arranged on the back surface of the light guiding plate 22.

The panel chassis 25 of the illustrated device is a frame structure slightly larger than the heat spreader 23 and formed by, for example, a white resin. The panel chassis 25 is, for example, mounted to the heat spreader 23 so as to cover a peripheral part of the light guiding plate 22 from above in the state where the light source member 21 and the light guiding plate 22 can be supported by the heat spreader 23 and the back light chassis 24.

The panel chassis 25 may include a shielding part 251 having an opening 250, and four of adjacent wall parts 252 vertically rising from a peripheral part of the shielding part 251. The shielding part 251 may include a panel-retaining part 253 to retain the liquid crystal panel 1 and a sheet-retaining part 254 to retain the optical sheet group 3, along a periphery of an edge of the opening 250. The shielding part 251 may further include a contact-preventing part 255 at a portion opposite to the liquid crystal panel 1 to prevent the contact of the light guiding plate 22 with the LED chip 211, which protrudes toward the light source member 21 and faces the light-entering surface 221 of the light guiding plate 22. The contact-preventing part 255 of the illustrated device is extended in a longitudinal direction of the substrate 210, having an approximately same length as the length in a longitudinal direction of the substrate 210. A connecting portion between the contact-preventing part 255 and the panel-retaining part 253 is rounded.

In the illustrated embodiment, an inner surface of the wall part 252 of the panel chassis 25 is constituted to abut against an outer surface of the wall part 232 of the heat spreader 23, the shielding part 251 is constituted to cover a peripheral part of the light guiding plate 22, and the contact-preventing part 255 is constituted to be positioned between the light-entering surface 221 of the light guiding plate 22 and the substrate 210 of the light source member 21, when the panel chassis 25 is mounted to the heat spreader 23.

The liquid crystal panel 1 and the optical sheet group 3 is mounted on the panel-retaining part 253 and the sheet-retaining part 254 of the panel chassis 25, respectively. A bezel 10 can be mounted to the light source device 2 in a state where the liquid crystal panel 1 and the optical sheet group 3 are mounted on the panel-retaining part 253 and the sheet-retaining part 254, respectively.

The bezel 10 of the illustrated device is a frame body slightly larger than the panel chassis 25. The bezel 10 may include an abutting portion 101 to abut against a peripheral part of the liquid crystal panel 1 on an inner surface of a flange portion of the frame body along a periphery of an opening of the frame body. The bezel 10 can cover the peripheral part of the liquid crystal panel 1, which is mounted on the light source device 2 (for example, on the panel-retaining part 253 of the panel chassis 25), from the front of the display device. As shown in FIG. 2, the abutting portion 101 of the bezel 10 may abut against the peripheral part of the liquid crystal panel 1 and an inner surface of the bezel 10 may abut against an outer surface of the wall part 252 of the panel chassis 25, when the bezel 10 is mounted to the light source device 2. This enables to hold the liquid crystal panel 1 between the abutting portion 101 on the inner surface of the flange portion of the bezel 10 and the panel-retaining part 253 of the panel chassis 25.

The exemplary display device according to the presently illustrated embodiment is constructed as described above. The display device will display an image by irradiating the back of the liquid crystal panel 1 with light using the light source device 2 and by driving and controlling each of the liquid crystal elements arrayed on the liquid crystal panel 1 with a driving circuit (not shown) to adjust a transmissivity of light in the respective liquid crystal elements (the respective pixels).

Figure 3:
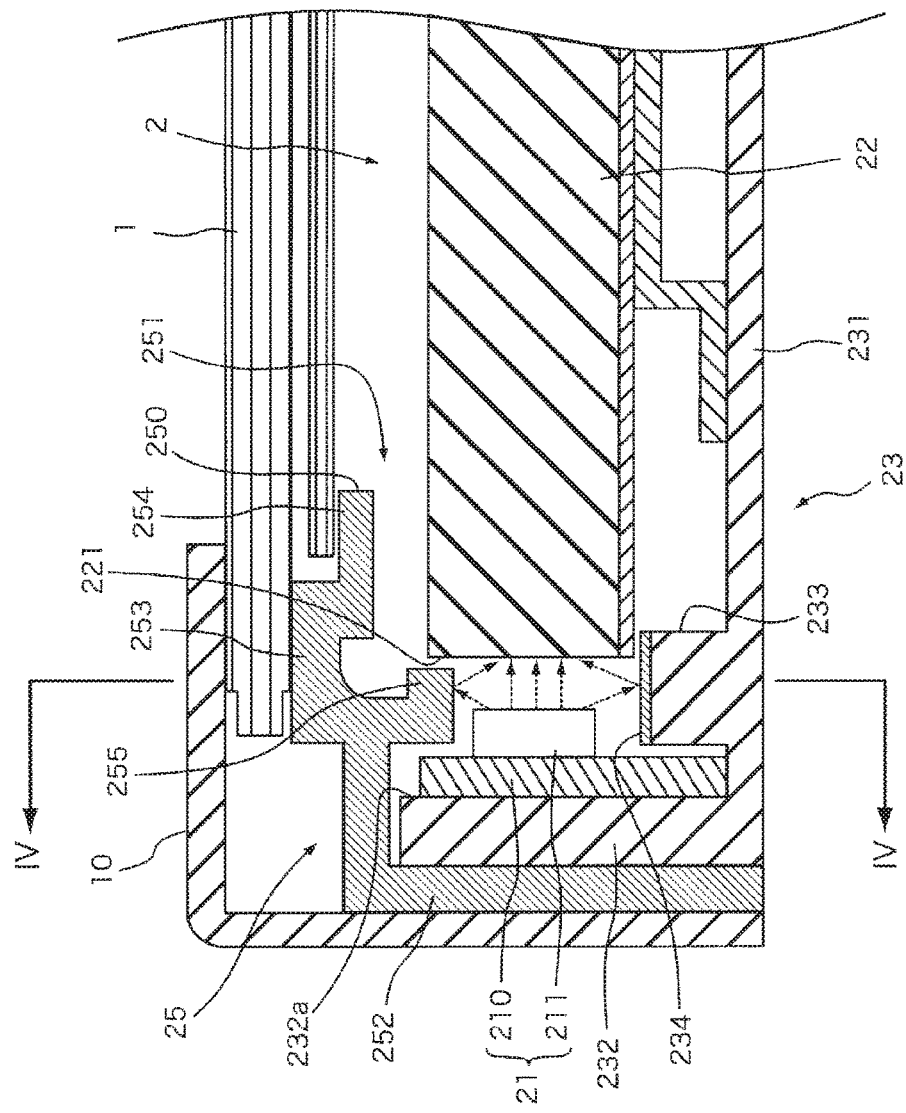
FIG. 3 shows a partially enlarged longitudinal sectional view of a display device according to Embodiment 1.

FIG. 3 shows a partially enlarged longitudinal sectional view of a display device according to Embodiment 1. The display device according to Embodiment 1 is configured such that the inner surface of the wall part 252 of the panel chassis 25 is constituted to abut against the outer surface of the wall part 232 of the heat spreader 23, the shielding part 251 is constituted to cover the peripheral part of the light guiding plate 22, and the contact-preventing part 255 is constituted to be positioned between the light-entering surface 221 of the light guiding plate 22 and the substrate 210 of the light source member 21. The panel chassis 25 is formed by, for example, a white resin, so that a part of the light radiated by the light source member 21 can be reflected on a surface of the shielding part 251 (specifically the contact-preventing part 255) without passing through the panel chassis 25 and can enter the light guiding plate 22 through the light-entering surface 221.

The bottom plate part 231 of the heat spreader 23 of the illustrated device includes a protruded part 233 protruding toward the LED chip 211 of the light source member 21 between the light source member 21 and the light-entering surface 221 of the light guiding plate 22. On a portion 233a of the protruded part 233, which is facing the LED chip 211, a reflection sheet 234 is adhered. This can prevent a part of the light radiated by the light source member 21 from leaking to the back of the light guiding plate 22 and ensures that it is reflected on the surface of the reflection sheet 234 and enters the light guiding plate 22 through the light-entering surface 221.

Thus, according to the presently illustrated embodiment, the leaking of the light radiated by the light source member 21 to the front of the display device (display screen) can be prevented, and the utilization percentage of the light source can be increased by respectively reflecting the light directed toward the front of the display device on the contact-preventing part 255 and the light directed toward the back of the display device on the reflection sheet 234 and allowing the light to enter the light guiding plate 22 through the light-entering surface 221.

In the presently illustrated embodiment, the exemplary light source device 2 has a configuration in which light radiated by the light source member 21 is reflected on the surface of the shielding part 251 (specifically the contact-preventing part 255) by forming the panel chassis 25 from a white resin, however, it should be understood that the device can have different configurations, for example, a configuration in which a light reflectivity will be given by adhering a reflection sheet on a portion of the contact-preventing part 255 that faces the LED chip 211 or by applying a white coating material to a portion of the contact-preventing part 255 that faces the LED chip 211.

Further, in the presently illustrated embodiment, the exemplary light source device 2 has a configuration in which a reflection sheet 234 is adhered on a portion 233a of the protruded part 233 which is facing the LED chip 211, however, it should be understood that the device can have different configurations, for example, a configuration in which a light reflectivity will be given by applying a white coating material to the portion 233a or by mirror finishing the portion 233a.

Figure 4:
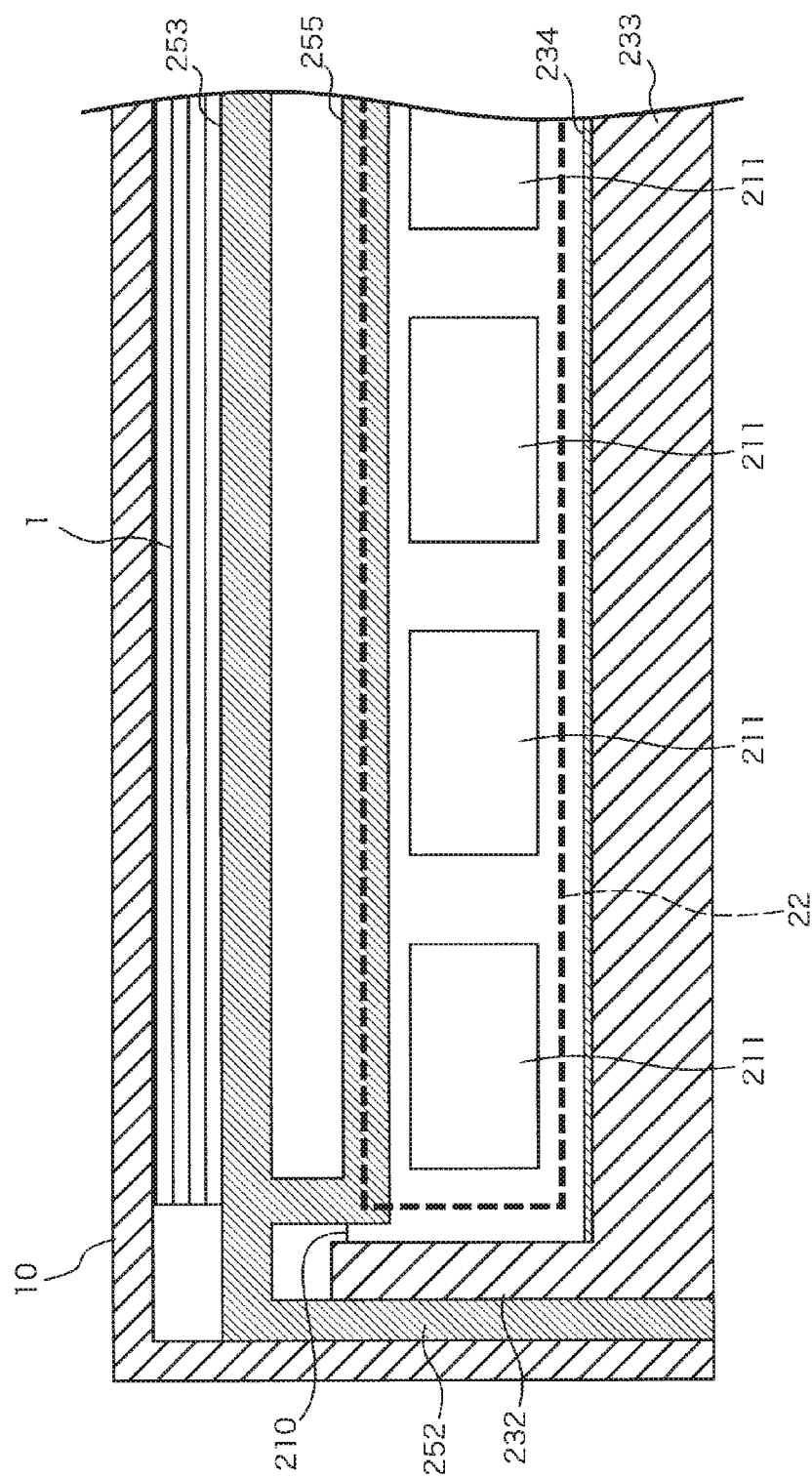
FIG. 4 shows a cross-sectional view taken on FIG. 3 along line IV-IV.

FIG. 4 shows a cross-sectional view taken on FIG. 3 along line IV-IV. In FIG. 4, the light guiding plate 22 is indicated by a dotted line to describe a relative positional relationship between the contact-preventing part 255 and the light guiding plate 22. In the presently illustrated embodiment, the contact-preventing part 255 is positioned between the light-entering surface 221 of the light guiding plate 22 and the light source member 21. This can make possible to prevent the contact of the light guiding plate 22 with a LED chip 211 when the light guiding plate 22 expands in in-plane direction by the heat generated in the light source member 21, since in the presently illustrated embodiment the light-entering surface 221 of the light guiding plate 22 will abut against the contact-preventing part 255 when the light guiding plate 22 expands in in-plane direction. Therefore, in the presently illustrated embodiment, breakage of the LED chip 211 due to the thermal expansion of the light guiding plate 22 can be avoided.

Further, as shown in FIG. 3, in the presently illustrated embodiment the connecting portion between the contact-preventing part 255 and the panel-retaining part 253 is rounded. This can make possible to reduce the concentration of stress on the connecting portion even when the light-entering surface 221 of the light guiding plate 22 abuts against the contact-preventing part 255, thereby preventing breakage or deformation of the contact-preventing part 255.

As described above, in the presently illustrated embodiment, the light radiated by the light source member 21 and then directed toward the front or back of the light guiding plate 22 is reflected either on the contact-preventing part 255 or the reflection sheet 234, and enters the light guiding plate 22 through the light-entering surface 221. This will lead sufficient use of the light that is radiated by the light source member 21 and suppress a deterioration of display quality due to the light leakage to the viewer of the display device. Further, in the presently illustrated embodiment, the contact of the light-entering surface 221 of the light guiding plate 22 with the LED chip 211 can be prevented even when the light guiding plate 22 expands in in-plane direction by the heat radiated by the light source member 21, since the light-entering surface 221 of the light guiding plate 22 will abut against the contact-preventing part 255 when the light guiding plate 22 expands in in-plane direction, thereby enabling to avoid the breakage of the LED chip 211.

Embodiment 2

In Embodiment 2, an exemplary embodiment of the display device in which a contact-preventing part 256 encloses a plurality of LED chips 211 provided in the light source member 21 is described. The display device according to Embodiment 2 has a configuration similar to that of the display device according to Embodiment 1 except for the configuration of the contact-preventing part. Accordingly, in the following descriptions, the components having configurations common to Embodiment 1 are denoted by the same reference numerals and will not be described.

Figure 5:
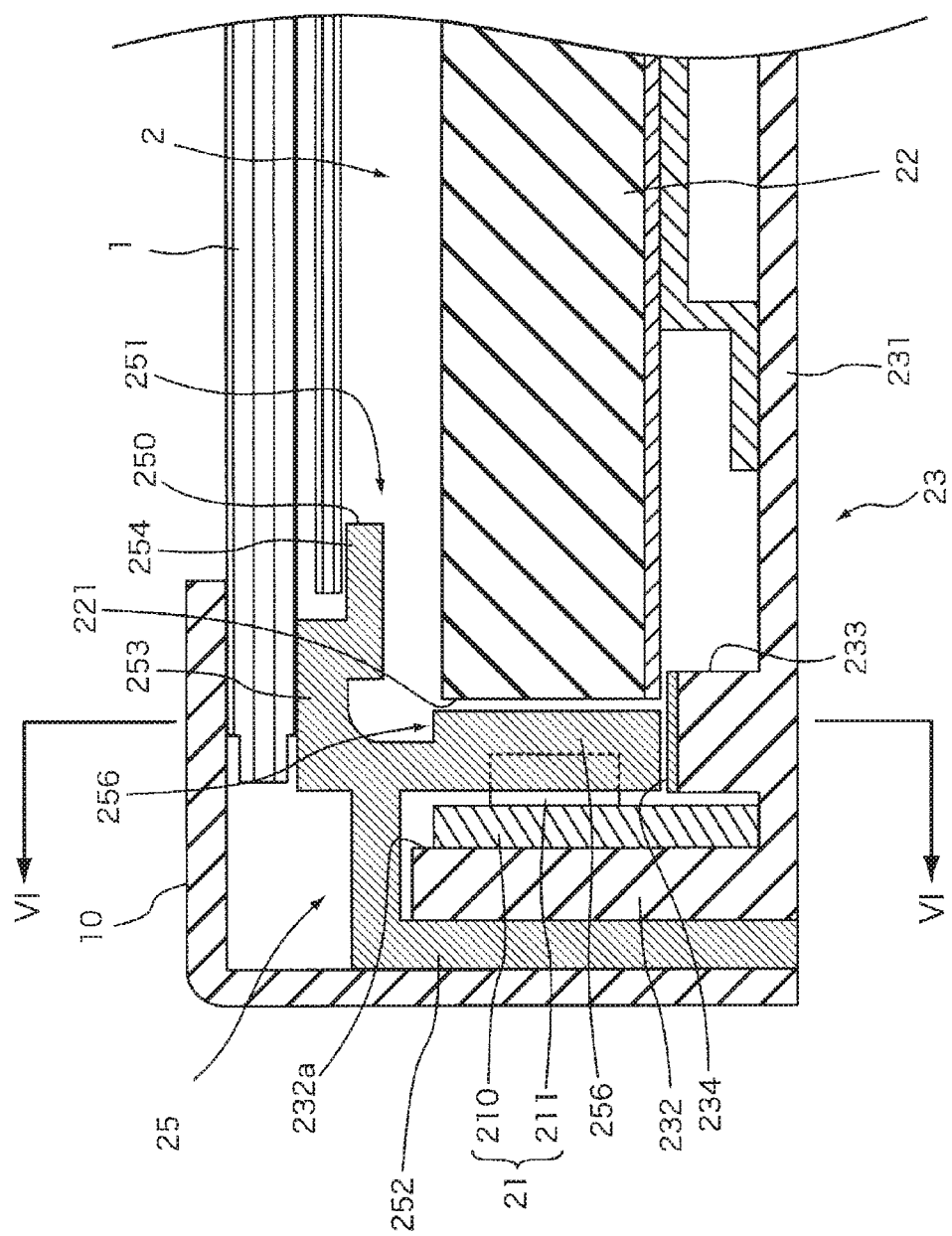
FIG. 5 shows a partially enlarged longitudinal sectional view of a display device according to Embodiment 2.
Figure 6:
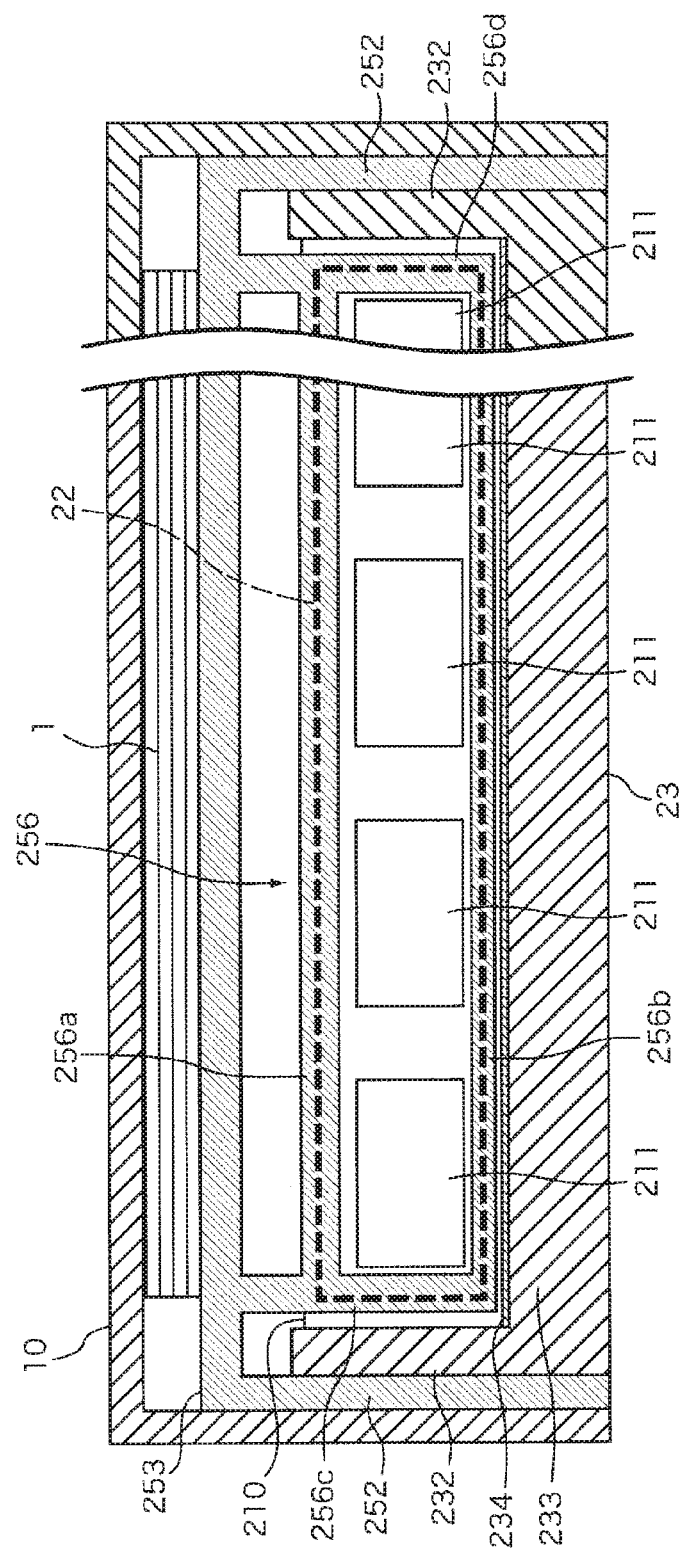
FIG. 6 shows a cross-sectional view taken on FIG. 5 along line VI-VI.

FIG. 5 shows a partially enlarged longitudinal sectional view of a display device according to Embodiment 2, and FIG. 6 shows a cross-sectional view taken on FIG. 5 along line VI-VI. The display device according to Embodiment 2 includes a panel chassis 25 surrounding a periphery of the light guiding plate 22. The panel chassis 25 is formed by, for example, a white resin, and may include a shielding part 251 and a wall part 252. The shielding part 251 of the panel chassis 25 may include a panel-retaining part 253 to retain the liquid crystal panel 1 and a sheet-retaining part 254 to retain the optical sheet group 3, similar to the shielding part 251 according to Embodiment 1, as well as a contact-preventing part 256 to prevent the contact of the light guiding plate 22 with the light source member 21 at the position facing the light-entering surface 221 of the light guiding plate 22.

In the illustrated embodiment, an inner surface of the wall part 252 of the panel chassis 25 is constituted to abut against an outer is surface of the wall part 232 of the heat spreader 23, the shielding part 251 is constituted to cover a peripheral part of the light guiding plate 22, and the contact-preventing part 256 is constituted to be positioned between the light-entering surface 221 of the light guiding plate 22 and the substrate 210 of the light source member 21, when the panel chassis 25 is mounted.

The contact-preventing part 256 may include a wall enclosing a plurality of LED chips 211, 211, . . . , 211. The wall of the contact-preventing part 256 may include a front wall part 256a disposed at a position that is a periphery of the light-emitting surface of the light guiding plate 22 and near the light-emitting surface compared to the LED chips 211, a rear wall part 256b disposed at a position that is a periphery of the back surface of the light guiding plate 22 and near the back surface of the light guiding plate 22 compared to the LED chips 211, and edge wall parts 256c, 256d each disposed opposed to the surface of a LED chip 211 that faces the wall part 232 of the heat spread 23.

According to the exemplary display device of Embodiment 2, which has the configuration described above, the light radiated by the light source member 21 and then directed toward the front or back of the display device is reflected either on an inner surface of the front wall part 256a of the contact-preventing part 256 or an inner surface of the rear wall part 256b of the contact-preventing part 256, and the reflected light enters the light guiding plate 22 through the light-entering surface 221. Further, the light radiated by the light source member 21 and then directed toward the wall part 232 of the heat spread 23 is reflected on an inner surface of either of the edge wall parts 256c, 256d, and the reflected light enters the light guiding plate 22 through the light-entering surface 221. Therefore, the utilization percentage of the light radiated by the light source member 21 can be further increased in Embodiment 2 compared with Embodiment 1.

Further, in the presently illustrated embodiment, the contact-preventing part 256 is positioned between the light-entering surface 221 of the light guiding plate 22 and the light source member 21, and thus when the light guiding plate 22 expands in in-plane direction by the heat generated in the light source member 21, the light-entering surface 221 of the light guiding plate 22 will abut against the front wall part 256a, the rear wall part 256b and the edge wall parts 256c, 256d of the contact-preventing part 256. This can make possible to prevent the contact of the light-entering surface 221 of the light guiding plate 22 with a LED chip 211 as well as the breakage of the LED chip 211.

Embodiment 3

In Embodiment 3, an exemplary embodiment of the display device in which a contact-preventing part encloses each of the plurality of the LED chips 211 provided in the light source member 21 is described. The display device according to Embodiment 3 has a configuration similar to that of the display device according to Embodiment 1 except for the contact-preventing part. Accordingly, in the following descriptions, the components having configurations common to Embodiment 1 are denoted by the same reference numerals and will not be described.

Figure 7:
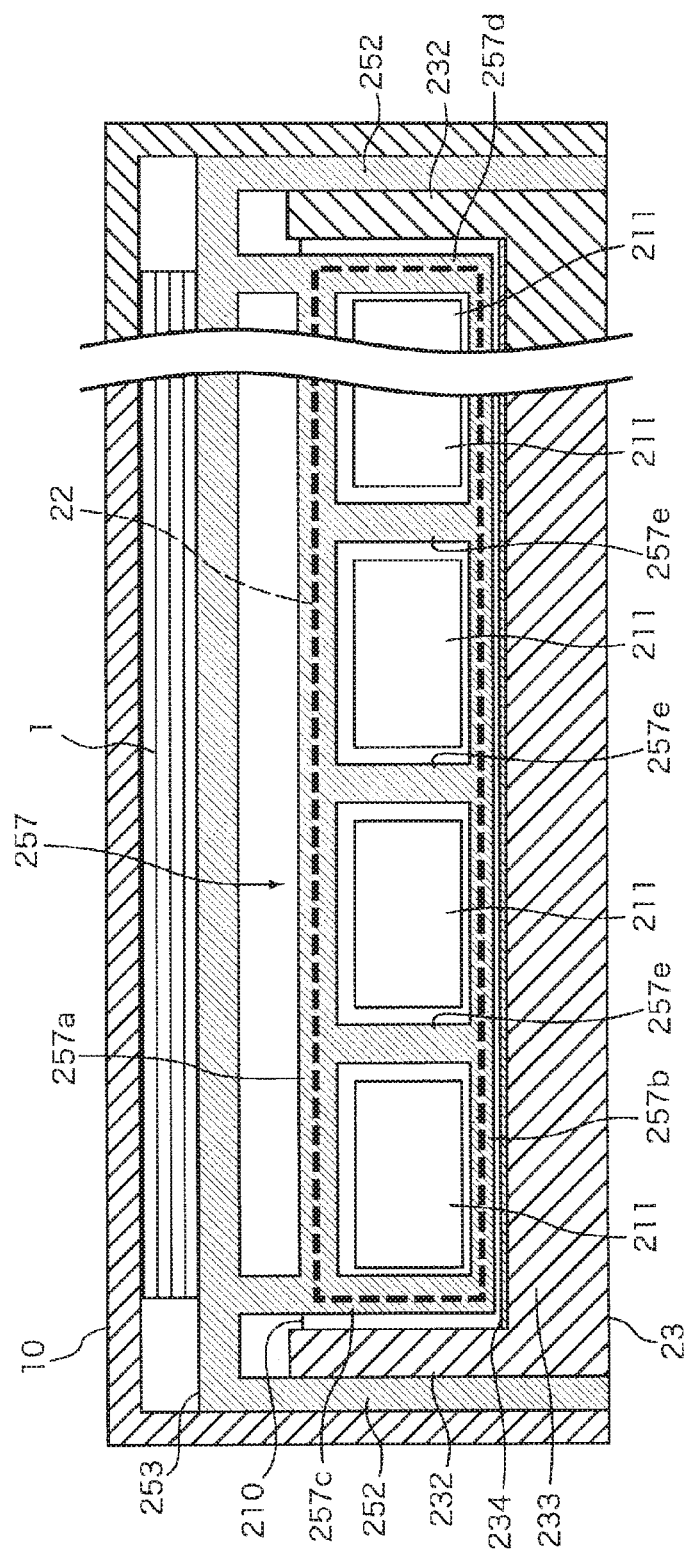
FIG. 7 shows a cross-sectional view of a contact-preventing part in Embodiment 3.

FIG. 7 shows a cross-sectional view of a contact-preventing part 257 in Embodiment 3. The contact-preventing part 257 according to Embodiment 3 includes a plurality of walls each enclosing each of the plurality of LED chips 211. The wall of the contact-preventing part 257 may include a front wall part 257a disposed at a position that is near the light-emitting surface of the light guiding plate 22 compared to the LED chips 211, a rear wall part 257b disposed at a position that is near the back surface of the light guiding plate 22 compared to the LED chips 211, edge wall parts 257c, 257d each disposed at a position that faces the wall part 232 of the heat spread 23, and a partition wall part 257e disposed between the two adjacent LED chips 211.

According to the exemplary display device of Embodiment 3, which has the configuration described above, the light radiated by the light source member 21 and then directed toward the front or back of the display device (up and down direction in FIG. 7) is reflected either on an inner surface of the front wall part 257a of the contact-preventing part 257 or an inner surface of the rear wall part 257b of the contact-preventing part 257, and the reflected light enters the light guiding plate 22 through the light-entering surface 221. Further, the light radiated by the light source member 21 and then directed perpendicularly to the front of the display device (left and right direction in FIG. 7) is reflected on inner surfaces of the edge wall parts 257c, 257d or on an surface of the partition wall part 257e, and the reflected light enters the light guiding plate 22 through the light-entering surface 221. Therefore, in Embodiment 3, the light radiated by the light source member 21 passes through the light-entering surface 221 and enters the light guiding plate 22 without any leaking, thus providing a further increase in the utilization percentage of the light.

Further, in the presently illustrated embodiment, the contact-preventing part 257 is positioned between the light-entering surface 221 of the light guiding plate 22 and the light source member 21, and thus when the light guiding plate 22 expands in in-plane direction by the heat generated in the light source member 21, the light-entering surface 221 of the light guiding plate 22 will abut against the front wall part 257a, the rear wall part 257b, the edge wall parts 257c, 257d and the partition wall part 257e of the contact-preventing part 257. This can make possible to prevent the contact of the light guiding plate 22 with the LED chip 211 as well as the breakage of the LED chip 211.

Embodiment 4

In Embodiment 4, an exemplary embodiment of the display device in which a contact-preventing part encloses a part of each of the LED chips 211 provided in the light source member 21 is described. The display device according to Embodiment 4 has a configuration similar to that of the display device according to Embodiment 1 except for the contact-preventing part. Accordingly, in the following descriptions, the components having configurations common to Embodiment 1 are denoted by the same reference numerals and will not be described.

Figure 8:
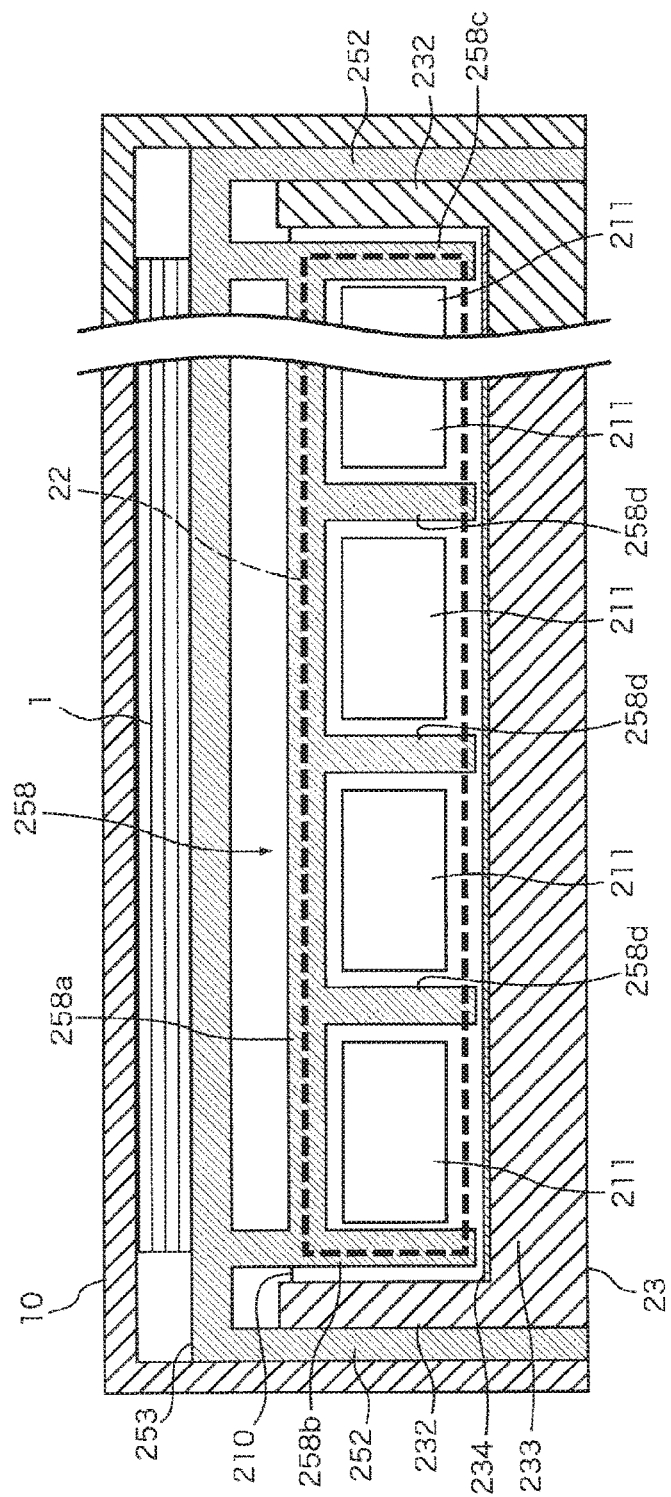
FIG. 8 shows a cross-sectional view of a contact-preventing part in Embodiment 4.

FIG. 8 shows a cross-sectional view of a contact-preventing part 258 in Embodiment 4. The contact-preventing part 258 according to Embodiment 4 includes a plurality of walls each enclosing a part of each of the LED chips 211, 211, . . . , 211. The wall of the contact-preventing part 258 may include a front wall part 258a disposed at a position that is near the front of the display device compared to the LED chips 211, edge wall parts 258b, 258c each disposed perpendicularly to the front of display device, and a foot wall part 258d disposed between the two adjacent LED chips 211.

According to the exemplary display device of Embodiment 4, which has the configuration described above, the light radiated by the light source member 21 and then directed toward the front or back of the display device (up and down direction in FIG. 7) is reflected either on an inner surface of the front wall part 258a of the contact-preventing part 258 or the reflection sheet 234 adhered on the protruded part 233 of the heat spreader 23, and the reflected light enters the light guiding plate 22 through the light-entering surface 221. Further, the light radiated by the light source member 21 and then directed perpendicularly to the front of the display device (left and right direction in FIG. 7) is reflected on an inner surface of either of the edge wall parts 258b, 258c or on a surface of the foot wall part 258d, and the reflected light enters the light guiding plate 22 through the light-entering surface 221. Therefore, in Embodiment 4, the light radiated by the light source member 21 passes through the light-entering surface 221 and enters the light guiding plate 22 without any leaking, thus providing a further increase in the utilization percentage of the light.

Further, in the presently illustrated embodiment, the contact-preventing part 258 is positioned between the light-entering surface 221 of the light guiding plate 22 and the light source member 21, and thus when the light guiding plate 22 expands in in-plane direction by the heat generated in the light source member 21, the light-entering surface 221 of the light guiding plate 22 will abut against the front wall part 258a, the edge wall parts 258b, 258c and the foot wall part 258d of the contact-preventing part 258. This can make possible to prevent the contact of the light guiding plate 22 with the LED chip 211 as well as the breakage of the LED chip 211.

It should be appreciated that the disclosed embodiments are intended to be illustrative and not restrictive in all respects. The scope of the present invention is not limited to the above-described context, and is defined by the claims, and the meaning equivalent to the claims and all modifications within the scope of the claims are intended to be included. In addition, various specific technical features described in the above embodiments can be combined in any suitable manner without contradiction.

For example, the exemplary embodiment of the display device in which a LED chip 211 is adopted as a light source member 21 is described in the above embodiments, however, a cold cathode fluorescent lamp (CCFL), an external electrode fluorescent lamp (EEFL), a hot cathode fluorescent lamp (HCFL), or the like can be adopted.

What is claimed is:

1. A light source device comprising:
   a light guiding plate having a light-entering surface, a light-emitting surface, and a back surface opposite to the light-emitting surface,
   a light source member having a light source and a substrate on which the light source is mounted, the light source being disposed opposite to the light-entering surface of the light guiding plate,
   a frame structure having a shielding part, the shielding part covering a peripheral part of the light-emitting surface of the light guiding plate, an optical sheet, wherein the shielding part has a sheet-retaining part, a front surface of which contacts with a back surface of the optical sheet to retain the optical sheet, and the sheet-retaining part does not contact with the light guiding plate, and a heat radiator supporting the substrate of the light source member, wherein the frame structure is provided with a contact-preventing part to prevent the contact of the light-entering surface with the light source, the contact-preventing part being disposed between the light source member and the light-entering surface without contacting the light-entering surface, wherein the contact-preventing part extends in a direction along a longitudinal direction of the substrate, and has an approximately same length as a length in the longitudinal direction of the substrate, and a portion of the heat radiator facing the light source and a portion of the contact-preventing part facing the light source each has light reflectivity.

2. The light source device of claim 1, wherein the contact-preventing part is formed by a light reflective resin.

3. The light source device of claim 1, wherein the heat radiator comprises:

a protruded part protruding toward the light source and a reflection sheet to reflect light, the reflection sheet being adhered on a surface of the protruded part facing the light source.

4. The light source device of claim 1, wherein the substrate is a strip-like substrate and the light source comprises a plurality of LEDs, the plurality of LEDs being mounted on the strip-like substrate along a longitudinal direction of the substrate, wherein the contact-preventing part comprises a wall enclosing the plurality of LEDs.

5. The light source device of claim 1, wherein the substrate is a strip-like substrate and the light source comprises a plurality of LEDs, the plurality of LEDs being mounted on the strip-like substrate along a longitudinal direction of the substrate, wherein the contact-preventing part comprises a plurality of walls each enclosing each of the plurality of LEDs.

6. A display device comprising:

the light source device of claim 1 and a display panel disposed opposite to the light-emitting surface of the light guiding plate of the light source device.

7. The display device of claim 6, wherein the shielding part of the frame structure has a panel-retaining part to retain the display panel.

8. The light source device of claim 1, wherein the portion of the contact-preventing part facing the light source is positioned to reflect the light irradiated to a front side.

9. The light source device of claim 1, further comprising a reflection sheet facing the back surface of the light guide plate, wherein the portion of the heat radiator is not in contact with the reflection sheet.

* * * * *